United States Patent
Wang et al.

(10) Patent No.: US 11,822,804 B2
(45) Date of Patent: Nov. 21, 2023

(54) MANAGING EXTENT SHARING BETWEEN SNAPSHOTS USING MAPPING ADDRESSES

(71) Applicant: VMware, Inc., Palo Alto, CA (US)

(72) Inventors: Wenguang Wang, Santa Clara, CA (US); Enning Xiang, Palo Alto, CA (US); Pranay Singh, Palo Alto, CA (US); Subhradyuti Sarkar, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/492,950

(22) Filed: Oct. 4, 2021

(65) Prior Publication Data
US 2023/0104544 A1    Apr. 6, 2023

(51) Int. Cl.
*G06F 12/00* (2006.01)
*G06F 3/06* (2006.01)
*G06F 12/02* (2006.01)

(52) U.S. Cl.
CPC .......... *G06F 3/0644* (2013.01); *G06F 3/0619* (2013.01); *G06F 3/0659* (2013.01); *G06F 3/0673* (2013.01); *G06F 12/0246* (2013.01); *G06F 2212/7201* (2013.01)

(58) Field of Classification Search
CPC .... G06F 3/0644; G06F 3/0619; G06F 3/0659; G06F 3/0673; G06F 12/0246; G06F 2212/7201
USPC ........................................................ 711/154
See application file for complete search history.

(56) References Cited

U.S. PATENT DOCUMENTS

| | | | |
|---|---|---|---|
| 8,874,864 B2 | 10/2014 | Corbett et al. | |
| 9,558,085 B2 | 1/2017 | Lakshman | |
| 9,697,267 B2 | 7/2017 | Kadayam et al. | |
| 10,248,336 B1 | 4/2019 | Koujalagi et al. | |
| 10,613,791 B2 | 4/2020 | Meister et al. | |
| 2017/0161150 A1* | 6/2017 | Rosin | G06F 16/275 |
| 2019/0121709 A1* | 4/2019 | Abouelwafa | G06F 3/061 |
| 2019/0129815 A1* | 5/2019 | Gao | G06F 11/3034 |

FOREIGN PATENT DOCUMENTS

CN       104714755       1/2020

\* cited by examiner

*Primary Examiner* — Mardochee Chery (57) ABSTRACT

The present disclosure is related to methods, systems, and machine-readable media for managing extent sharing between snapshots using mapping addresses. A first mapping address can be assigned to a first extent responsive to a request to write the first extent. A second mapping address can be assigned to a second extent responsive to a request to write the second extent. A snapshot can be created. A snapshot mapping address, that is monotonically increased from the second mapping address, can be assigned to the snapshot. A third mapping address, that is monotonically increased from the second mapping address, can be assigned to a third extent of the snapshot responsive to a request to write the third extent. An ownership status of each of the first extent, the second extent, and the third extent can be determined based respectively on: a comparison between the first mapping address and the snapshot mapping address, a comparison between the second mapping address and the snapshot mapping address, and a comparison between the third mapping address and the snapshot mapping address.

17 Claims, 5 Drawing Sheets

MANAGING EXTENT SHARING BETWEEN SNAPSHOTS USING MAPPING ADDRESSES

BACKGROUND

A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may purchase data storage and/or data processing services from the provider in order to run applications that handle the enterprises' core business and operational data. The applications may be proprietary and used exclusively by the enterprise or made available through a network for anyone to access and use.

Virtual computing instances (VCIs) have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. In a software defined data center, storage resources may be allocated to VCIs in various ways, such as through network attached storage (NAS), a storage area network (SAN) such as fiber channel and/or Internet small computer system interface (iSCSI), a virtual SAN, and/or raw device mappings, among others.

Snapshots may be utilized in a software defined data center to provide backups and/or disaster recovery. For instance, a snapshot can be used to revert to a previous version or state of a VCI. Supporting snapshots may include determining the extents of a file system that are "owned" by a snapshot and the extents of the file system that are shared between snapshots. Such determinations may be utilized when a snapshot is to be deleted or if an extent is to be overwritten.

DETAILED DESCRIPTION

The term "virtual computing instance" (VCI) refers generally to an isolated user space instance, which can be executed within a virtualized environment. Other technologies aside from hardware virtualization can provide isolated user space instances, also referred to as data compute nodes. Data compute nodes may include non-virtualized physical hosts, VCIs, containers that run on top of a host operating system without a hypervisor or separate operating system, and/or hypervisor kernel network interface modules, among others. Hypervisor kernel network interface modules are non-VCI data compute nodes that include a network stack with a hypervisor kernel network interface and receive/transmit threads.

VCIs, in some embodiments, operate with their own guest operating systems on a host using resources of the host virtualized by virtualization software (e.g., a hypervisor, virtual machine monitor, etc.). The tenant (i.e., the owner of the VCI) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VCI segregation that may be offered in hypervisor-virtualized environments that virtualize system hardware, and thus can be viewed as a form of virtualization that isolates different groups of applications that operate in different containers. Such containers may be more lightweight than VCIs.

While the specification refers generally to VCIs, the examples given could be any type of data compute node, including physical hosts, VCIs, non-VCI containers, and hypervisor kernel network interface modules. Embodiments of the present disclosure can include combinations of different types of data compute nodes.

As used herein with respect to VCIs, a "disk" is a representation of memory resources (e.g., memory resources 110 illustrated in FIG. 1) that are used by a VCI. As used herein, "memory resource" includes primary storage (e.g., cache memory, registers, and/or main memory such as random access memory (RAM)) and secondary or other storage (e.g., mass storage such as hard drives, solid state drives, removable media, etc., which may include non-volatile memory). The term "disk" does not imply a single physical memory device. Rather, "disk" implies a portion of memory resources that are being used by a VCI, regardless of how many physical devices provide the memory resources.

A storage volume snapshot (referred to herein simply as "snapshot") is a copy of a disk file at a given point in time. In some embodiments, a snapshot is a copy of a disk file of a VCI at a given point in time. A snapshot can preserve the state of a storage volume so that it can be reverted to at a later point in time. A snapshot corresponds to one or more extents. An extent is a contiguous area of storage reserved for a file in a file system. An extent can be represented, for instance, as a range of block numbers. Stated differently, an extent can include one or more data blocks that store data. As discussed further below, in some cases a single snapshot can "own" an extent. In other cases, more than one snapshot can "share" an extent. Stated differently, more than one snapshot can own an extent. Where a snapshot "owning" an extent is discussed herein, it is to be understood that such ownership refers to exclusive ownership and not shared ownership. Where a snapshot sharing an extent is discussed herein, it is to be understood that such shared ownership does not refer to exclusive ownership.

Extent sharing management refers generally to determining and/or keeping track of the extents of a file system that are owned by a snapshot and the extents of the file system that are shared between snapshots. Among other instances, this information may be used when the system is determining whether to free payload data of an extent when a logical extent is overwritten or if the owner (e.g., the snapshot that owns the extent) is to be deleted. Generally, deleting a snapshot includes deleting any extents that are owned by the snapshot to be deleted and retaining any extents that are shared by that snapshot.

Some approaches to extent sharing management (referred to herein as "reference counting methods") include adding a reference count for each extent. In these approaches, the reference count of the extent is incremented when a new page is copied out on write, and the reference count is decremented when a relevant snapshot is deleted. However, these approaches suffer from performance issues. When deleting a snapshot, for instance, the system has to scan the metadata (CoW (copy on write) B+tree) of all extents accessible to the snapshot. Such scans may encompass a large number of extents. The IO cost of these scans can be very high.

Other approaches to extent sharing management (referred to herein as "shared bit methods") include adding a shared bit in each logical map extent. In these approaches, the shared bit of a new extent is initialized as "unshared." When a page is copied out on write, the shared bit of extent(s) in the new page is initialized to "shared." The shared bit is then changed to "unshared" for an extent that is overwritten in the running point. In some cases, the shared bit of extents in read-only snapshots is not maintained. When deleting the parent snapshot of the running point, for any extents that are only shared with the snapshot to be deleted and the running point, the system changes the shared bit (from "shared" to "unshared") of the corresponding extents in the running point. These shared bit changes can trigger many metadata IO operations and are prone to performance issues.

Embodiments of the present disclosure can manage extent sharing without using the reference counts of reference counting methods or the shared bits of shared bit methods. As a result, embodiments herein can manage extent sharing with significantly lower IO overhead than previous approaches. Accordingly, in cases when a snapshot is to be deleted or if an extent is to be overwritten, embodiments herein exhibit increased performance versus previous approaches.

In accordance with the present disclosure, and as discussed further below, each snapshot can have its own logical map B+tree. Some embodiments include mapping a logical block address (LBA) of an extent to a physical sector address (PSA) in the snapshot logical map by way of what is referred to herein as a "mapping address" or a "middle block address" (MBA). An MBA is a unique identifier (e.g., number) assigned to each extent. In some embodiments, the MBA is monotonically increased with each newly-written extent (e.g., when an MBA block is allocated for each new write request).

Embodiments herein can include a first mapping between the LBA of an extent and an MBA, which may be referred to herein as a "snapshot logical map" or simply a "logical map." Embodiments herein can include a second mapping between the MBA and the PSA of an extent, which may be referred to herein as a "middle mapping" or "middle map"). The middle mapping can include compression and checksum information of the data blocks.

By utilizing the monotonically increasing MBA, embodiments of the present disclosure can simplify extent sharing management and reduce IO overhead. In addition to assigning an MBA to each extent, embodiments herein can additionally assign an identifier to each snapshot. This identifier, which may be alternately referred to herein as a "snapshot mapping address," a "snapshotMBA" or an "SSMBA," can be assigned when a snapshot is created. As described further below, the SSMBA reflects the latest (e.g., current) number of the monotonically-increasing MBA. In an example, if the MBA has increased from 1 to 2 due to the writing of two extents and then a snapshot is created, the creation of the snapshot results in that snapshot being assigned an SSMBA of 3. An extent then written to the snapshot is assigned an MBA of 3 and subsequent extents written to the snapshot are respectively assigned MBAs increasing monotonically (e.g., 4, 5, 6, etc.). As will be appreciated, the MBA of any extents written to a snapshot will be equal to, or greater than, the SSMBA of that snapshot. Because of the monotonically increasing nature of the MBA, a child snapshot will necessarily have a larger SSMBA than that of its parent snapshot. As described further below, relying on the relation between the MBA of an extent and the SSMBA of the running point, embodiments of the present disclosure can readily determine whether payload data of an extent needs to be freed up when it is overwritten.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 608 in FIG. 5. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Figure 1:
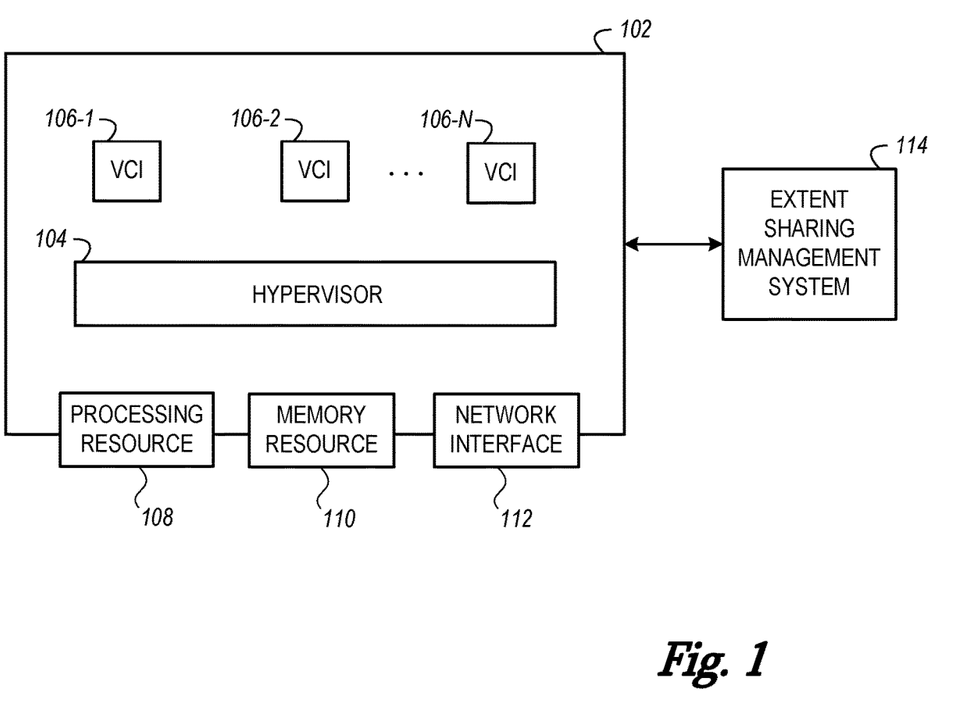
FIG. 1 is a diagram of a host and a system for managing extent sharing between snapshots using mapping addresses according to one or more embodiments of the present disclosure.

FIG. 1 is a diagram of a host and a system for file system event monitoring using metadata snapshots according to one or more embodiments of the present disclosure. The system can include a host 102 with processing resources 108 (e.g., a number of processors), memory resources 110, and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of virtual computing instances 106-1, 106-2, . . . , 106-N (referred to generally herein as "VCIs 106"). The VCIs can be provisioned with processing resources 108 and/or memory resources 110 and can communicate via the network interface 112. The processing resources 108 and the memory resources 110 provisioned to the VCIs can be local and/or remote to the host 102. For example, in a software defined data center, the VCIs 106 can be provisioned with resources that are generally available to the software defined data center and not tied to any particular hardware device. By way of example, the memory resources 110 can include volatile and/or non-volatile memory available to the VCIs 106. The VCIs 106 can be moved to different hosts (not specifically illustrated), such that a different hypervisor manages the VCIs 106. The host 102 can be in communication with an extent sharing management system 114. An example of the extent sharing management system 114 is illustrated and described in more detail below. In some embodiments, the extent sharing management system 114 can be a server, such as a web server.

Figure 2A:
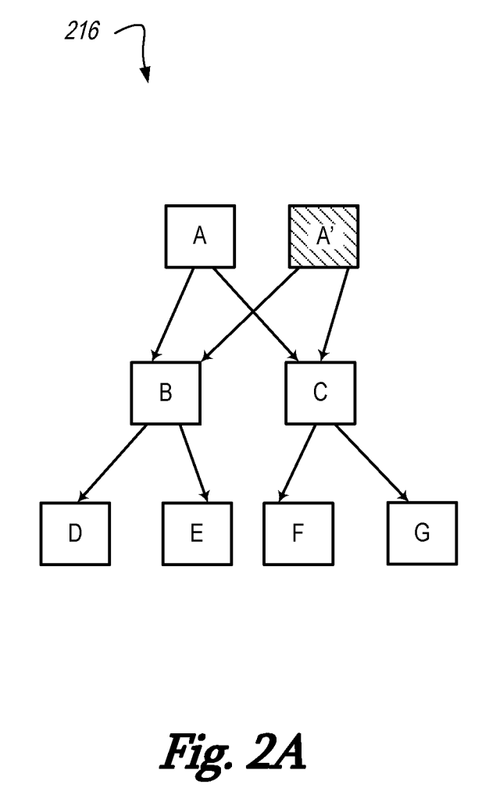
FIG. 2A illustrates an example file system B–tree according to one or more embodiments of the present disclosure at a first time instance.
Figure 2B:
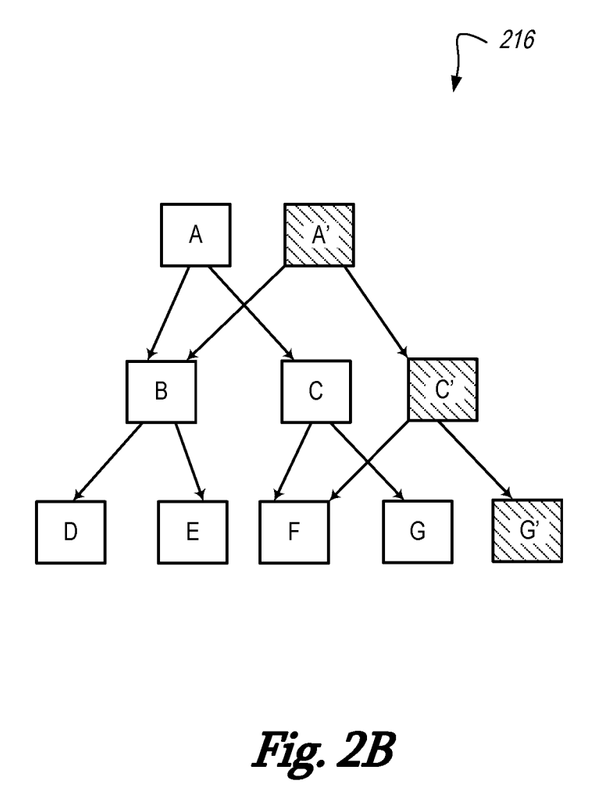
FIG. 2B illustrates the example file system B–tree at a second time instance.

FIG. 2A illustrates an example file system B-tree 216 according to one or more embodiments of the present disclosure at a first time instance. FIG. 2B illustrates the example file system B-tree 216 at a second time instance. FIGS. 2A and 2B may be cumulatively referred to herein as "FIG. 2." As shown in FIG. 2, the B-tree 216 includes an old root node A and new root node A'. The latest version of the file system (e.g., new writes) would point to root node A', whereas the older root node A would be pointed to by snapshot. A live sub-volume represents the share of the file system where files are created and deleted (e.g., the disk backing which a VCI is currently writing to). As new writes happen to the live sub-volume, the two B-trees start to differ. Thus, as shown in FIG. 2B, nodes C' and G' have been added as child nodes of root node A'. The live sub-volume may be alternatively referred to herein as a "running point."

Snapshots can be used to support backup, replication, and local data protection, which involves storing older versions of the data in snapshots. As previously discussed, snapshots can be taken periodically, but do not allow old (e.g., shared) data to be deleted.

Figure 3:
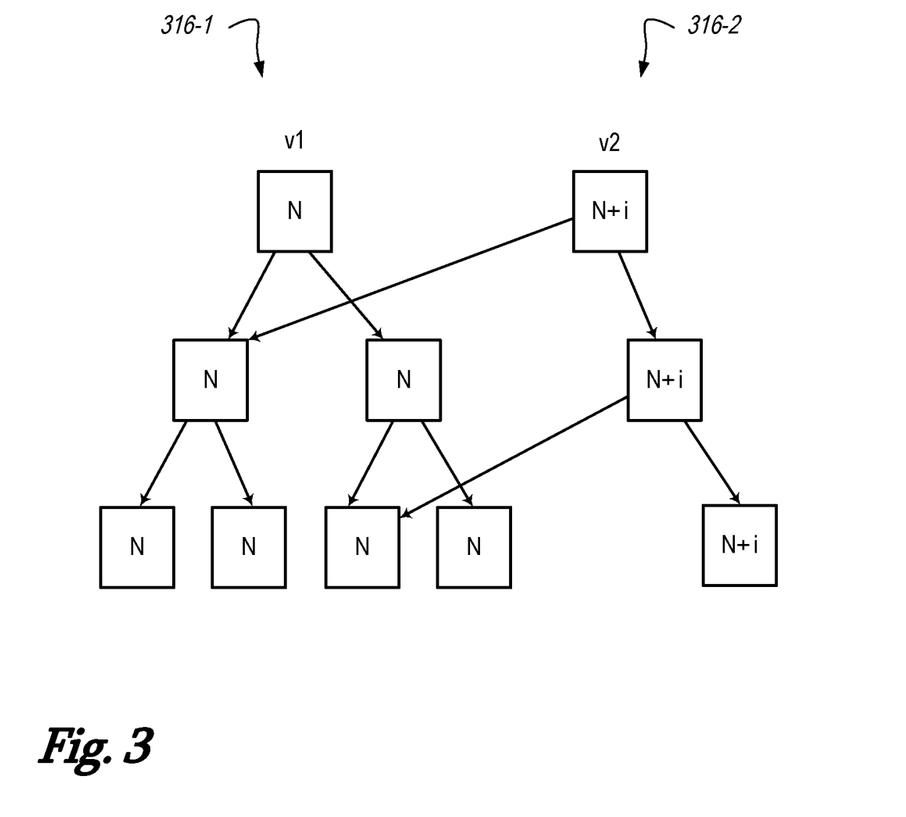
FIG. 3 illustrates two example file system B–trees, each belonging to a snapshot of a given sub-volume according to one or more embodiments of the present disclosure.

FIG. 3 illustrates two example file system B-trees, each belonging to a snapshot of a given sub-volume according to one or more embodiments of the present disclosure. The file system B-trees illustrated in FIG. 3 are a first tree 316-1 and a second tree 316-2. The first tree 316-1 may be alternatively referred to as "snapshot 1" and the second tree 316-2 may be alternatively referred to as "snapshot 2." In FIG. 3, squares represent the page/node of the B-tree and the label on each page is a pagestamp (e.g., a monotonically increasing pagestamp) associated with that page. B-tree implementation enforces the fact that pagestamps of internal and leaf nodes cannot be greater than the root of the B-tree.

As previously discussed, some previous approaches use lazy reference counting of file system B-tree and embedded reference counting to track the ownership of extents. The embedded reference count is a shared bit per extent (variable size data block) that tracks the ownership of an extent together with the page stamping of the node. Thus, the same extent may be considered shared (e.g., owned by more than one snapshot) when read by one snapshot and owned (e.g., owned by a single snapshot) when read by a different snapshot. In some other previous approaches, the value of shared bit 0 (e.g., refcount 0) represents owner access and shared bit 1 represents shared access. If the snapshot Id of the root node and the leaf node is the same, the shared bit is unchanged, but if the snapshot Id is greater than the pagestamp of the leaf node, the shared bit will have a value of 1, representing shared access. Ownership of an extent in snapshots can be indicated by a shared bit value of "0" and sharing of an extent in traditional snapshots can be indicated by a shared bit value of "1.". This shared bit can be used by the live sub-volume to determine whether the extent can be written, or if a new extent allocation is required during overwrite. Each node is stamped with a snapshot Id. This scheme of ownership of extent is based on the fact that if the root node of the file system B-tree is the same as the leaf node of the file system B-tree, the root node and the leaf node were updated and/or created with the same snapshot Id, and are therefore of the same generation. However, if the stamping (snapshot Id) of the leaf node and the root node differ, the root node and the leaf node of the B-Tree are of different generations. If so, the B-tree does not own the extents, but has shared access. Thus, any potential overwrite would include the allocation of a new extent. Stated differently, if an extent is modified, an indication that the extent is owned causes the extent to be modified without allocating a new extent. If an extent is modified, an indication that the extent is shared causes a new extent to be allocated.

As may be known to those of skill in the art, deleting a snapshot can be considered a two-step process. The first step can be termed as "hollowing out," wherein any extents that are owned by the snapshot are deleted. The second step can involve deleting non-shared nodes of the B-tree.

Figure 4:
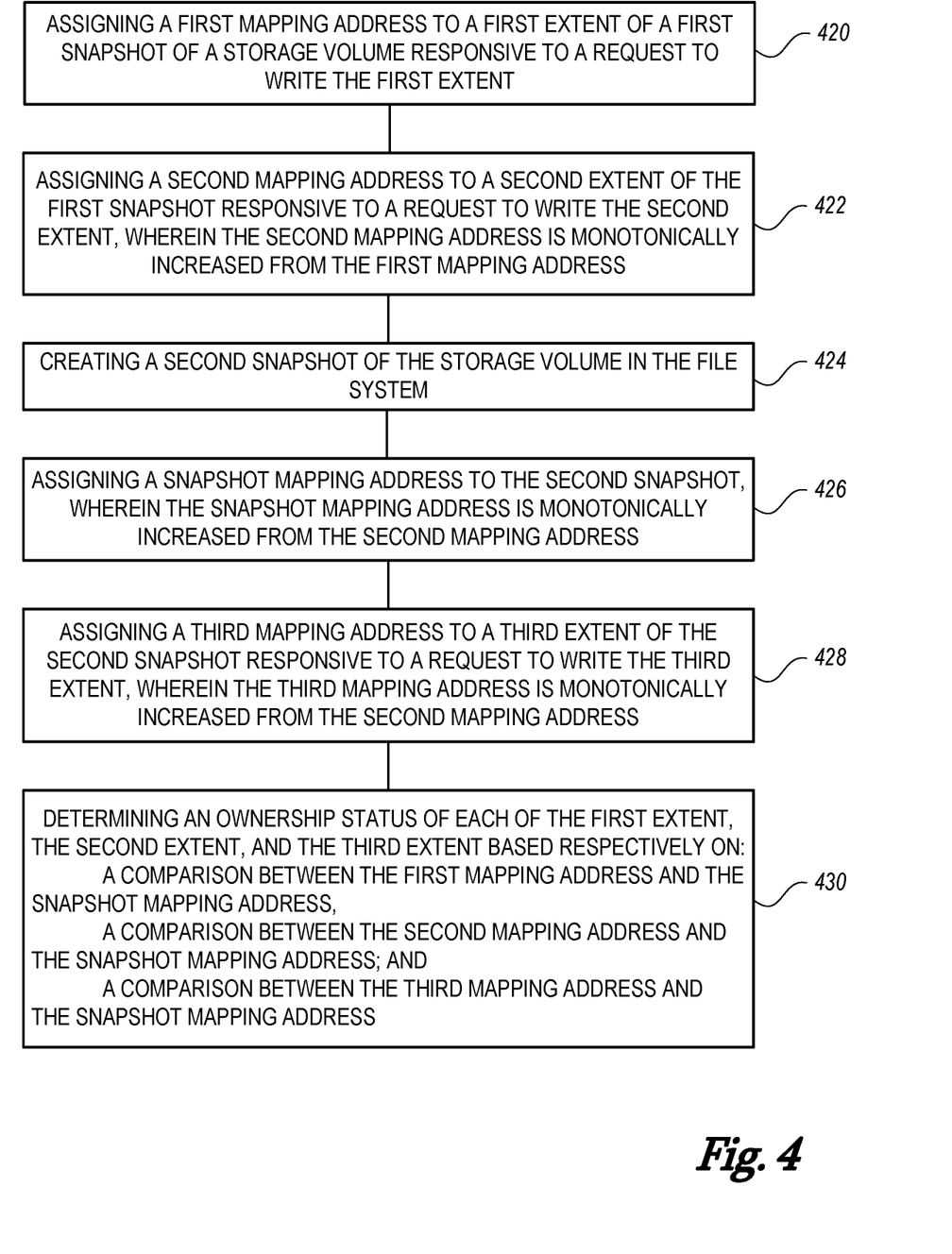
FIG. 4 is a flow chart illustrating one or more methods for managing extent sharing between snapshots using mapping addresses according to one or more embodiments of the present disclosure.

FIG. 4 is a flow chart illustrating one or more methods for managing extent sharing between snapshots using mapping addresses according to one or more embodiments of the present disclosure. FIG. 4 discusses one or more embodiments of the present disclosure using an example. It is noted however, that the present disclosure is not limited to the number or nature of the extents and/or snapshots discussed in the example.

The MBA (e.g., the MBA value or number) of the middle map, discussed further below, can be monotonically increased and the latest MBA value (e.g., nextMBA) can be maintained. The nextMBA can be monotonically increased each time an MBA block is allocated for a new write request. At a first time instance, T0, nextMBA is 1 and the SSMBA of the running point (RP) is 1. It is noted that while the example of a snapshot (S1) and an RP is discussed herein, embodiments herein may refer to two snapshots, neither of which is live sub-volume (RP). The two snapshots may be a parent snapshot and a child snapshot, as will be understood to those of ordinary skill in the art. Where the term RP is used in this example, it should be appreciated that RP can refer to a second (e.g., child) snapshot.

At a next time instance T1, at 420, the method can include assigning a first mapping address (MBA) to a first extent (referred to herein as "extent 1") of a first snapshot of a storage volume in a file system responsive to a request to write the first extent. When a write request is received, the MBA of the extent written (extent 1) is 1. nextMBA is increased to 2. The SSMBA of the first snapshot, which can be described as the minimum MBA of all the extents of a snapshot, is 1.

At a next time instance T2, at 422, the method can include assigning a second mapping address to a second extent (referred to herein as "extent 2") of the first snapshot responsive to a request to write the second extent, wherein the second mapping address is monotonically increased from the first mapping address. The MBA of extent 2 is 2 (monotonically increased from 1). nextMBA is increased to 3. The RP includes extent 1 and extent 2. SSMBA of the first snapshot remains 1.

At a next time instance T3, at 424, the method can include creating a second snapshot of the storage volume in the file system. The first snapshot, S1, which was the previous RP, is no longer the RP. As previously discussed, the SSMBA of each snapshot (e.g., the snapshot for the new RP) is initialized to the current nextMBA of the system when the snapshot is created, which, in this example, is 3. Accordingly, at 426, the method can include assigning a snapshot mapping address to the second snapshot, wherein the snapshot mapping address is monotonically increased from the second mapping address. The new RP has two extents shared with S1 (extent 1 and extent 2) but does not yet have any owned extents.

At a next time instance, at 428, the method can include assigning a third mapping address to a third extent (referred to herein as "extent 3") of the second snapshot responsive to a request to write the third extent, wherein the third mapping address is monotonically increased from the second mapping address. Extent 3 has an MBA of 3 (the current nextMBA). At this point, extent 1 is owned by S1 but shared with the RP, and extent 2 is owned by S1 but shared with the RP. Extent 3 is owned (e.g., exclusively owned) by the RP. The SSMBA of the RP is 3. These ownership statuses can be determined by comparing or determining the relationships between MBA(s) and the SSMBA of the RP. For instance, the method can include, at 430, determining an ownership status of each of the first extent, the second extent, and the third extent based respectively on a comparison between the first mapping address and the snapshot mapping address (of the RP), a comparison between the second mapping address and the snapshot mapping address (of the RP), and a comparison between the third mapping address and the snapshot mapping address (of the RP). Because the MBAs of extent 1 and extent 2 (1 and 2, respectively) are both less than the SSMBA of the RP (3), extent 1 and extent 2 can be determined to be shared by the RP and S1. Because the MBA of extent 3 is greater than or equal to the SSMBA of the RP, extent 3 can be determined to be owned (e.g., exclusively owned) by the RP.

In a sense, embodiments herein can determine ownership of extents that are accessible to the RP. In this example, the first extent, the second extent, and the third extent are all accessible to the RP via a logical map of the RP. If, in another example, the logical blocks of the first extent and/or second extent are overwritten at the RP, the data of the first extent and/or second extent may no longer be accessible to the RP.

In some embodiments, the method includes receiving a request to delete S1. In response to the request, the method can include transferring ownership of the first extent and the second extent to the second snapshot (e.g., in the mapping table, discussed further below) and changing the snapshot mapping address to the first mapping address. Deleting a snapshot in accordance with the present disclosure, in contrast to previous approaches, is much less computationally intensive as fewer IO operations are performed.

As previously discussed, embodiments herein include a mapping architecture. For instance, in some embodiments, the method includes maintaining a mapping table. The mapping table can include associations between LBAs, MBAs, and PSAs. For instance, for the example discussed above, a mapping table may associate a first LBA of the first extent with the first MBA, the first MBA with a first PSA, a second LBA of the second extent with the second MBA, the second MBA with a second PSA, a third LBA of the third extent with the third MBA, and the third MBA with a third PSA.

In some embodiments, the mapping table can be thought of as two separate maps, a logical map that includes mappings between LBAs and MBAs, and a middle map that includes mappings between MBAs and PSAs. For example, the logical map schema for an extent can include a key of LBA and a value of MBA, numBlocks (e.g., the number of blocks comprising the extent). The middle map schema for the extent can include a key of MBA and a value of PSA, numBlocks. In some embodiments, the values of the middle map can include compression and checksum information of the data blocks. For example, the middle map can include cyclic redundancy check (CRC) code.

In some embodiments, the method includes receiving a request to overwrite an extent. Relying on the relationship between the MBA of an extent and SSMBA of the RP, embodiments herein can determine whether the payload data of the extent needs to be freed up when the extent is overwritten.

For example, a request to overwrite extent 1 can be received. The method can include determining that the first extent is shared by the second snapshot and the first snapshot responsive to a determination that the first mapping address is less than the snapshot mapping address. In some embodiments the method can include modifying the mapping table such that the mapping table associates the first LBA with a fourth mapping address and associates the fourth mapping address with a fourth PSA. Because, for example, the MBA of extent 1 is less than the RP SSMBA (3), extent 1 is determined to be shared and a new extent can be allocated with MBA 4. If, for example, the MBA of 1 of extent 1 pointed to a first PSA (e.g., 100), the MBA of 4 can point to a new PSA (e.g., 500) to store the data of the overwrite. After, LBA 1 can point to MBA 4.

In a different example, a request to overwrite extent 3 is received. The method can include determining that the third extent is owned by the second snapshot responsive to a determination that the third extent is greater than or equal to the snapshot mapping address, and modifying the mapping table such that the mapping table associates the third mapping address with a fifth PSA. In contrast with the above example, the MBA (3) of extent 3 is greater than or equal to the SSMBA (3), the PSA can simply be updated from a first PSA (e.g., 600) to a second PSA (e.g., 800). In such an example, a new extent need not be allocated.

Figure 5:
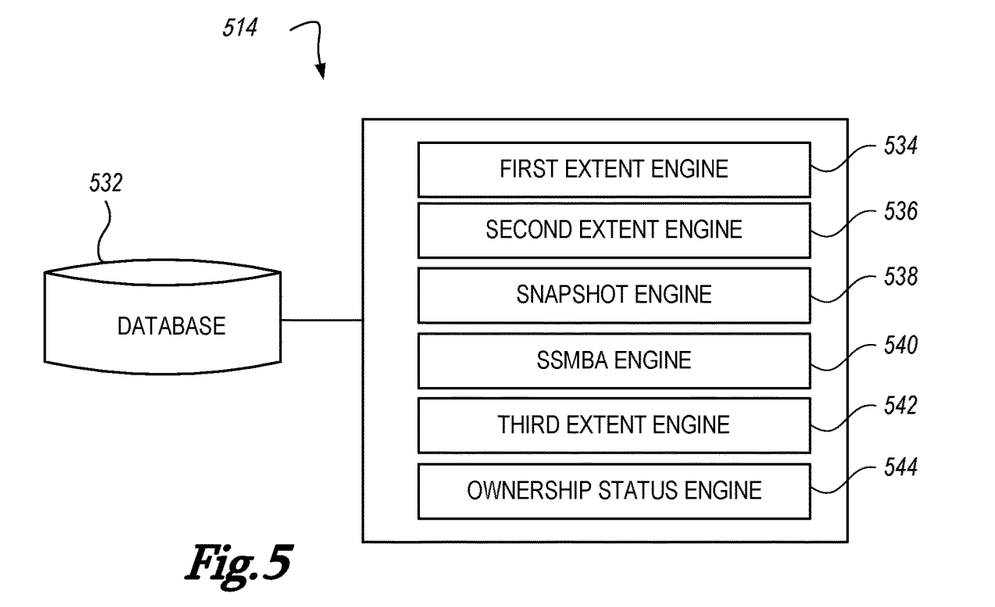
FIG. 5 is a diagram of a system for managing extent sharing between snapshots using mapping addresses according to one or more embodiments of the present disclosure.

FIG. 5 is a diagram of a system 514 for managing extent sharing between snapshots using mapping addresses according to one or more embodiments of the present disclosure. The system 514 can include a database 532 and/or a number of engines, for example first extent engine 534, second extent engine 536, snapshot engine 538, SSMBA engine 540, third extent engine 542 and/or ownership status engine 544, and can be in communication with the database 532 via a communication link. The system 514 can include additional or fewer engines than illustrated to perform the various functions described herein. The system 514 can represent program instructions and/or hardware of a machine (e.g., machine 646 as referenced in FIG. 6, etc.). As used herein, an "engine" can include program instructions and/or hardware, but at least includes hardware. Hardware is a physical component of a machine that enables it to perform a function. Examples of hardware can include a processing resource, a memory resource, a logic gate, an application specific integrated circuit, a field programmable gate array, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the first extent engine 534 can include a combination of hardware and program instructions that is configured to assign a first mapping address to a first extent of a first snapshot of a storage volume in a file system responsive to a request to write the first extent. In some embodiments, the second extent engine 536 can include a combination of hardware and program instructions that is configured to assign a second mapping address to a second extent of the first snapshot responsive to a request to write the second extent, wherein the second mapping address is monotonically increased from the first mapping address. In some embodiments, the snapshot engine 538 can include a combination of hardware and program instructions that is configured to create a second snapshot of the storage volume in the file system. In some embodiments, the SSMBA engine 540 can include a combination of hardware and program instructions that is configured to assign a snapshot mapping address to the second snapshot, wherein the snapshot mapping address is monotonically increased from the second mapping address. In some embodiments, the third extent engine 542 can include a combination of hardware and program instructions that is configured to assign a third mapping address to a third extent of the second snapshot responsive to a request to write the third extent, wherein the third mapping address is monotonically increased from the second mapping address. In some embodiments, the ownership status engine 544 can include a combination of hardware and program instructions that is configured to determine an ownership status of each of the first extent, the second extent, and the third extent based respectively on a comparison between the first mapping address and the snapshot mapping address, a comparison between the second mapping address and the snapshot mapping address, and a comparison between the third mapping address and the snapshot mapping address.

Figure 6:
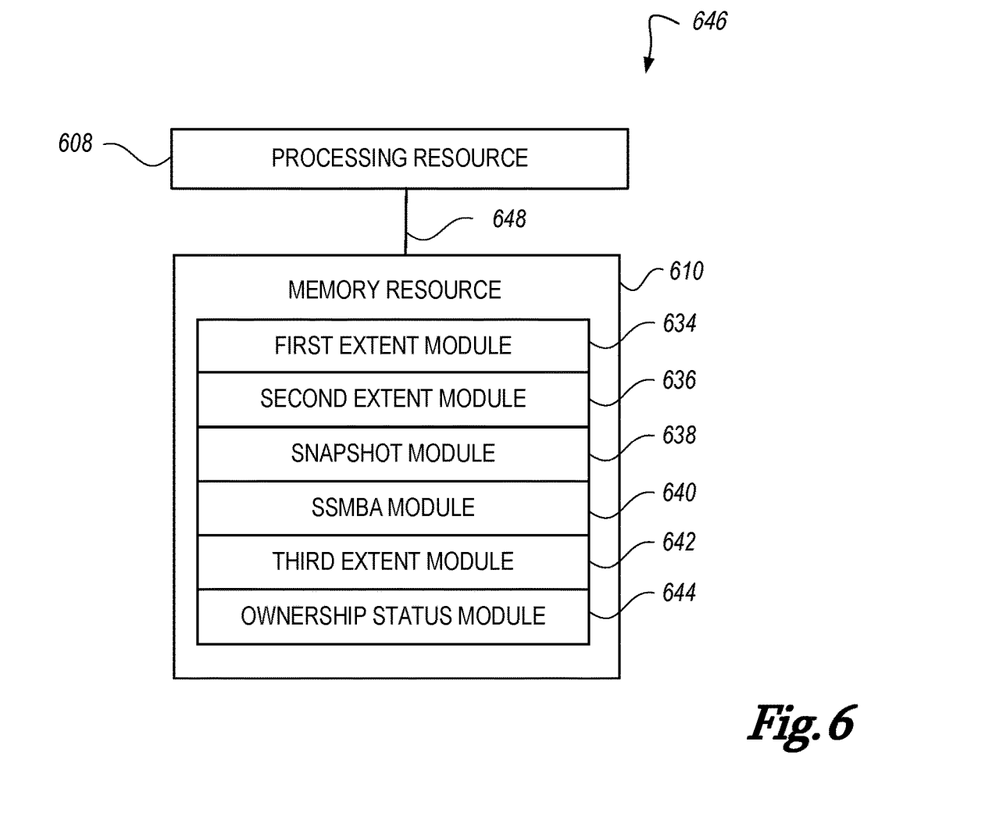
FIG. 6 is a diagram of a machine for managing extent sharing between snapshots using mapping addresses according to one or more embodiments of the present disclosure.

FIG. 6 is a diagram of a machine 646 for managing extent sharing between snapshots using mapping addresses according to one or more embodiments of the present disclosure. The machine 646 can utilize software, hardware, firmware, and/or logic to perform a number of functions. The machine 646 can be a combination of hardware and program instructions configured to perform a number of functions (e.g., actions). The hardware, for example, can include a number of processing resources 608 and a number of memory resources 610, such as a machine-readable medium (MRM) or other memory resources 610. The memory resources 610 can be internal and/or external to the machine 646 (e.g., the machine 646 can include internal memory resources and have access to external memory resources). In some embodiments, the machine 646 can be a VCI. The program instructions (e.g., machine-readable instructions (MRI)) can include instructions stored on the MRM to implement a particular function (e.g., an action such as creating a metadata snapshot). The set of MRI can be executable by one or more of the processing resources 608. The memory resources 610 can be coupled to the machine 646 in a wired and/or wireless manner. For example, the memory resources 610 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 610 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change memory (PCM), 3D cross-point, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, magnetic memory, optical memory, non-volatile memory express (NVMe) drive, and/or a solid state drive (SSD), etc., as well as other types of machine-readable media.

The processing resources 608 can be coupled to the memory resources 610 via a communication path 648. The communication path 648 can be local or remote to the machine 646. Examples of a local communication path 648 can include an electronic bus internal to a machine, where the memory resources 610 are in communication with the processing resources 608 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 648 can be such that the memory resources 610 are remote from the processing resources 608, such as in a network connection between the memory resources 610 and the processing resources 608. That is, the communication path 648 can be a network connection. Examples of such a network connection can include a local area network (LAN), wide area network (WAN), personal area network (PAN), and the Internet, among others.

As shown in FIG. 6, the MRI stored in the memory resources 610 can be segmented into a number of modules 634, 636, 638, 640, 642, 644 that when executed by the processing resources 608 can perform a number of functions. As used herein a module includes a set of instructions included to perform a particular task or action. The number of modules 634, 636, 638, 640, 642, 644 can be sub-modules of other modules. For example, the second extent module 636 can be a sub-module of the first extent module 634 and/or can be contained within a single module. Furthermore, the number of modules 634, 636, 638, 640, 642, 644 can comprise individual modules separate and distinct from one another. Examples are not limited to the specific modules 634, 636, 638, 640, 642, 644 illustrated in FIG. 6.

Each of the number of modules 634, 636, 638, 640, 642, 644 can include program instructions and/or a combination of hardware and program instructions that, when executed by a processing resource 608, can function as a corresponding engine as described with respect to FIG. 5. For example, the SSMBA module 640 can include program instructions and/or a combination of hardware and program instructions that, when executed by a processing resource 608, can function as the SSMBA engine 540, though embodiments of the present disclosure are not so limited.

The machine 646 can include a first extent module 634, which can include instructions to assign a first mapping address to a first extent of a first snapshot of a storage volume in a file system responsive to a request to write the first extent. The machine 646 can include a second extent module 636, which can include instructions to assign a second mapping address to a second extent of the first snapshot responsive to a request to write the second extent, wherein the second mapping address is monotonically increased from the first mapping address. The machine 646 can include a snapshot module 638, which can include instructions to create a second snapshot of the storage volume in the file system. The machine 646 can include a SSMBA module 640, which can include instructions to assign a snapshot mapping address to the second snapshot, wherein the snapshot mapping address is monotonically increased from the second mapping address. The machine 646 can include a third extent module 642, which can include instructions to assign a third mapping address to a third extent of the second snapshot responsive to a request to write the third extent, wherein the third mapping address is monotonically increased from the second mapping address. The machine 646 can include an ownership status module 644, which can include instructions to determine an ownership status of each of the first extent, the second extent, and the third extent based respectively on a comparison between the first mapping address and the snapshot mapping address, a comparison between the second mapping address and the snapshot mapping address, and a comparison between the third mapping address and the snapshot mapping address.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   assigning a first mapping address to a first extent of a first snapshot of a storage volume responsive to a request to write the first extent;
   assigning a second mapping address to a second extent of the first snapshot responsive to a request to write the second extent, wherein the second mapping address is monotonically increased from the first mapping address;
   creating a second snapshot of the storage volume in the file system;
   assigning a snapshot mapping address to the second snapshot, wherein the snapshot mapping address is monotonically increased from the second mapping address;
   assigning a third mapping address to a third extent of the second snapshot responsive to a request to write the third extent, wherein the third mapping address is monotonically increased from the second mapping address;
   determining an ownership status of each of the first extent, the second extent, and the third extent, including:
      determining that the first extent is shared by the second snapshot and the first snapshot responsive to a determination that the first mapping address is less than the snapshot mapping address,
      determining that the second extent is shared by the second snapshot and the first snapshot responsive to a determination that the second mapping address is less than the snapshot mapping address; and
      determining that the third extent is owned by the second snapshot responsive to a determination that the third mapping address is greater than or equal to the snapshot mapping address.

2. The method of claim 1, wherein the method includes, responsive to receiving a request to delete the first snapshot:
   transferring ownership of the first extent and the second extent to the second snapshot; and
   changing the snapshot mapping address to the first mapping address.

3. The method of claim 1, wherein the method includes maintaining a mapping table, wherein the mapping table associates:
   a first logical block address (LBA) of the first extent with the first mapping address;
   the first mapping address with a first physical sector address (PSA);
   a second LBA of the second extent with the second mapping address;
   the second mapping address with a second PSA;
   a third LBA of the third extent with the third mapping address; and
   the third mapping address with a third PSA.

4. The method of claim 3, wherein the method includes:
   receiving a request to overwrite the first extent subsequent to assigning the third mapping address to the third extent;
   determining that the first extent is shared by the second snapshot and the first snapshot responsive to a determination that the first mapping address is less than the snapshot mapping address; and
   modifying the mapping table such that the mapping table associates the first LBA with a fourth mapping address and associates the fourth mapping address with a fourth PSA.

5. The method of claim 4, wherein the method includes:
receiving a request to overwrite the third extent subsequent to assigning the third mapping address to the third extent;
determining that the third extent is owned by the second snapshot responsive to a determination that the third extent is greater than or equal to the snapshot mapping address; and
modifying the mapping table such that the mapping table associates the third mapping address with a fifth PSA.

6. The method of claim 1, wherein the snapshot mapping address is equal to a smallest mapping address of any extents owned by the second snapshot.

7. A non-transitory machine-readable medium having instructions stored thereon which, when executed by a processor, cause the processor to:
assign a first mapping address to a first extent of a first snapshot of a storage volume responsive to a request to write the first extent;
assign a second mapping address to a second extent of the first snapshot responsive to a request to write the second extent, wherein the second mapping address is monotonically increased from the first mapping address;
create a second snapshot of the storage volume in the file system;
assign a snapshot mapping address to the second snapshot, wherein the snapshot mapping address is monotonically increased from the second mapping address;
assign a third mapping address to a third extent of the second snapshot responsive to a request to write the third extent, wherein the third mapping address is monotonically increased from the second mapping address; and
determine an ownership status of each of the first extent, the second extent, and the third extent, including:
determining that the first extent is shared by the second snapshot and the first snapshot responsive to a determination that the first mapping address is less than the snapshot mapping address,
determining that the second extent is shared by the second snapshot and the first snapshot responsive to a determination that the second mapping address is less than the snapshot mapping address; and
determining that the third extent is owned by the second snapshot responsive to a determination that the third mapping address is greater than or equal to the snapshot mapping address.

8. The medium of claim 7, including instructions, responsive to receiving a request to delete the first snapshot, to:
transfer ownership of the first extent and the second extent to the second snapshot; and
change the snapshot mapping address to the first mapping address.

9. The medium of claim 7, including instructions to maintain a mapping table, wherein the mapping table associates:
a first logical block address (LBA) of the first extent with the first mapping address;
the first mapping address with a first physical sector address (PSA);
a second LBA of the second extent with the second mapping address;
the second mapping address with a second PSA;
a third LBA of the third extent with the third mapping address; and
the third mapping address with a third PSA.

10. The medium of claim 9, including instructions to:
receive a request to overwrite the first extent subsequent to assigning the third mapping address to the third extent;
determine that the first extent is shared by the second snapshot and the first snapshot responsive to a determination that the first mapping address is less than the snapshot mapping address; and
modify the mapping table such that the mapping table associates the first LBA with a fourth mapping address and associates the fourth mapping address with a fourth PSA.

11. The medium of claim 10, including instructions to:
receive a request to overwrite the third extent subsequent to assigning the third mapping address to the third extent;
determine that the third extent is owned by the second snapshot responsive to a determination that the third extent is greater than or equal to the snapshot mapping address; and
modify the mapping table such that the mapping table associates the third mapping address with a fifth PSA.

12. The medium of claim 7, wherein the snapshot mapping address is equal to a smallest mapping address of any extents owned by the second snapshot.

13. A system, comprising:
a first extent engine configured to assign a first mapping address to a first extent of a first snapshot of a storage volume responsive to a request to write the first extent;
a second extent engine configured to assign a second mapping address to a second extent of the first snapshot responsive to a request to write the second extent, wherein the second mapping address is monotonically increased from the first mapping address;
a snapshot engine configured to create a second snapshot of the storage volume in the file system;
a snapshot middle block address (SSMBA) engine configured to assign a snapshot mapping address to the second snapshot, wherein the snapshot mapping address is monotonically increased from the second mapping address;
a third extent engine configured to assign a third mapping address to a third extent of the second snapshot responsive to a request to write the third extent, wherein the third mapping address is monotonically increased from the second mapping address;
an ownership status engine configured to determine an ownership status of each of the first extent, the second extent, and the third extent, including:
determining that the first extent is shared by the second snapshot and the first snapshot responsive to a determination that the first mapping address is less than the snapshot mapping address,
determining that the second extent is shared by the second snapshot and the first snapshot responsive to a determination that the second mapping address is less than the snapshot mapping address; and
determining that the third extent is owned by the second snapshot responsive to a determination that the third mapping address is greater than or equal to the snapshot mapping address.

14. The system of claim 13, wherein the ownership status engine is configured to, responsive to receiving a request to delete the first snapshot:
transfer ownership of the first extent and the second extent to the second snapshot; and change the snapshot mapping address to the first mapping address.

15. The system of claim 13, wherein the ownership status engine is configured to maintain a mapping table, wherein the mapping table associates:
- a first logical block address (LBA) of the first extent with the first mapping address;
- the first mapping address with a first physical sector address (PSA);
- a second LBA of the second extent with the second mapping address;
- the second mapping address with a second PSA;
- a third LBA of the third extent with the third mapping address; and
- the third mapping address with a third PSA.

16. The system of claim 15, wherein the ownership status engine is configured to:
- receive a request to overwrite the first extent subsequent to assigning the third mapping address to the third extent;
- determine that the first extent is shared by the second snapshot and the first snapshot responsive to a determination that the first mapping address is less than the snapshot mapping address; and
- modify the mapping table such that the mapping table associates the first LBA with a fourth mapping address and associates the fourth mapping address with a fourth PSA.

17. The system of claim 16, wherein the ownership status engine is configured to:
- receive a request to overwrite the third extent subsequent to assigning the third mapping address to the third extent;
- determine that the third extent is owned by the second snapshot responsive to a determination that the third extent is greater than or equal to the snapshot mapping address; and
- modify the mapping table such that the mapping table associates the third mapping address with a fifth PSA.

* * * * *